(12) United States Patent
Bodtker (10) Patent No.: US 7,836,790 B2
(45) Date of Patent: Nov. 23, 2010

(54) TILT STEERING COLUMN ASSEMBLY FOR A VEHICLE

(75) Inventor: Joen C. Bodtker, Flint, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 181 days.

(21) Appl. No.: 11/904,367

(22) Filed: Sep. 27, 2007

(65) Prior Publication Data

US 2009/0084218 A1    Apr. 2, 2009

(51) Int. Cl.
*B62D 1/18* (2006.01)
(52) U.S. Cl. ......................................... 74/493; 403/371
(58) Field of Classification Search .................. 74/493; 403/109.1, 150, 151–155, 158, 161, 344, 403/371; 411/80.5–80.6, 44, 75, 513; 16/273, 16/306–308, 342, 386; 384/276, 295, 439
See application file for complete search history.

(56) References Cited

U.S. PATENT DOCUMENTS

| | | | |
|---|---|---|---|
| 2,754,716 A | 7/1956 | Bourns | |
| 3,922,867 A * | 12/1975 | Scott | 411/61 |
| 4,012,913 A * | 3/1977 | Scott | 411/479 |
| 4,389,809 A * | 6/1983 | Fischer | 446/122 |
| 4,469,357 A * | 9/1984 | Martin | 285/381.3 |
| 4,474,493 A | 10/1984 | Welch | |
| 4,659,270 A * | 4/1987 | Herb | 411/40 |
| 4,881,843 A * | 11/1989 | Randleman | 403/92 |
| 4,892,330 A | 1/1990 | Beauch | |
| 4,903,540 A | 2/1990 | Beauch | |
| 5,605,351 A | 2/1997 | Higashino | |
| 5,788,277 A | 8/1998 | Hibino et al. | |
| 5,899,497 A | 5/1999 | Spencer et al. | |
| 6,134,983 A | 10/2000 | Armstrong et al. | |
| 6,991,397 B2 | 1/2006 | Welch | |
| 7,241,095 B2 | 7/2007 | Apsey | |

* cited by examiner

*Primary Examiner*—Richard W Ridley
*Assistant Examiner*—Terence Boes
(74) *Attorney, Agent, or Firm*—Cantor Colburn LLP

(57) ABSTRACT

A tilt steering column assembly having a first housing defining at least one orifice disposed along a central axis and a second housing defining at least one hole disposed along the central axis is disclosed. A pin includes a body having a first end and a second end facing the first end to define a seam. A first tab extends outwardly from a segment of the first end and a second tab extends outwardly from a segment of the second end. The first tab abuts the second tab to define a portion of the seam with a remainder of the first and second ends being spaced from each other to define a gap and a remaining portion of the seam for providing a proper fit of the pin within the orifice and the hole by compensating for varying dimensions of at least one of the orifice and the hole.

11 Claims, 6 Drawing Sheets

TILT STEERING COLUMN ASSEMBLY FOR A VEHICLE

BACKGROUND OF THE INVENTION

1. Field of the Invention

The present invention relates to a tilt steering column assembly for a vehicle. More specifically to a pin apparatus for coupling together a first member and a second member and a method of making a pin formed from a sheet material.

2. Description of the Prior Art

Tilt steering column assemblies are utilized in vehicles for changing a position of a steering wheel upwardly or downwardly relative to a driver of the vehicle. The assembly includes a tilt housing coupled to a support housing by a pin with the tilt housing rotatable relative to the support housing for adjusting the position of the steering wheel. The support housing defines a orifice and the tilt housing defines an hole for receiving the pin. Typically, the pin is formed from steel wire or steel bar that is machined to the proper size. The pin defines a first portion press fit into the orifice of the support housing and a second portion slip fit into the hole of the tilt housing for allowing the tilt housing to rotate relative to the support housing. In order to achieve a lash free quality of the second portion slip fit into the hole, very close tolerances between the hole and the pin must be maintained which adversely affects the cost to manufacture the components.

SUMMARY OF THE INVENTION AND ADVANTAGES

The present invention provides for a tilt steering column assembly having a first housing defining at least one orifice disposed along a central axis and a second housing defining at least one hole disposed along the central axis. A pin including a body having a first end and a second end facing the first end to define a seam substantially parallel to the central axis is disposed in the orifice and the hole. The assembly includes a pin apparatus having the body. The body defines a bore along the central axis with the body having a first portion disposed in at least one of the orifice and the hole and a second portion extending from the first portion and disposed in another one of the orifice and the hole for coupling the first housing to the second housing. A first tab extends outwardly from a segment of the first end and a second tab extends outwardly from a segment of the second end. The first tab abuts the second tab to define a portion of the seam with a remainder of the first and second ends being spaced from each other to define a gap and a remaining portion of the seam for providing a proper fit of the pin within the orifice and the hole by compensating for varying dimensions of at least one of the orifice and the hole.

The present invention also provides a method of making a pin formed from a sheet material having a body including a first periphery and a second periphery with the body having a first portion and a second portion extending from the first portion. The method includes the steps of cutting the first periphery to a predetermined length to define a first tab extending from the first end and cutting the second periphery to a predetermined length to define a second tab extending from the second end. The method further includes the step of rolling the body until the first and second tabs abut each other to define a bore and a portion of a seam with a remainder of the first and second ends spaced from each other to define a gap and a remaining portion of the seam to form the pin that compensates for varying dimensions.

Accordingly, the present invention provides for a pin apparatus able to perform more uniformly over a wider range of tolerances and provide a lash free quality. This pin apparatus reduces the tolerance requirements previously required in tilt steering column assemblies, thereby reducing the manufacturing costs.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
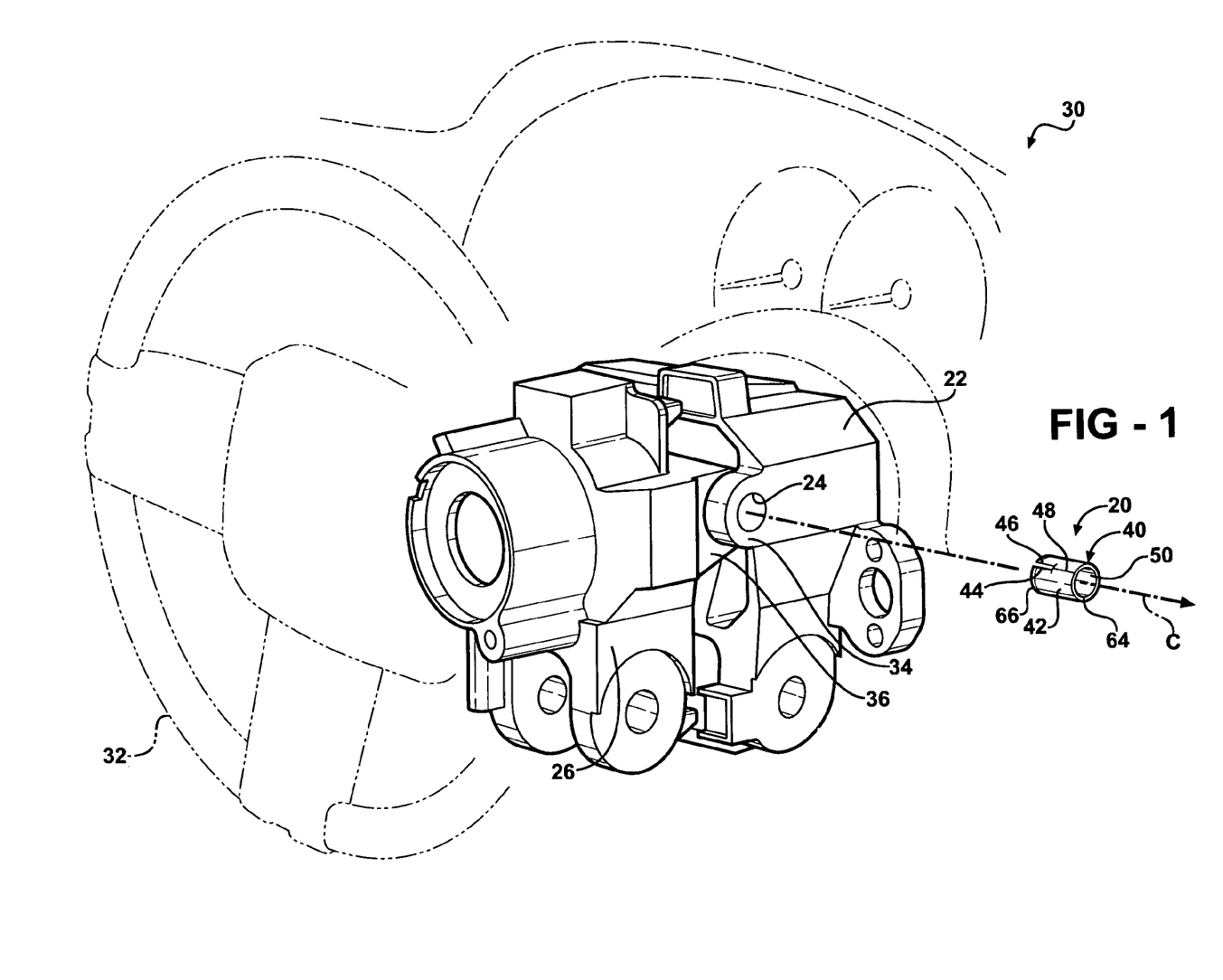
FIG. 1 is a partially exploded perspective view of a tilt steering column assembly having a pin apparatus for coupling a first member to a second member of a first embodiment.

Referring to the Figures, wherein like numerals indicate like or corresponding parts throughout the several views, a pin apparatus 20 for coupling together a first member 22 defining a orifice 24 along a central axis C and a second member 26 defining an hole 28 along the central axis C is generally shown in FIG. 1.

In the embodiments shown in FIGS. 1-12, the pin apparatus 20 is adapted to be used in a tilt steering column assembly 30 for a vehicle (not shown). However, it is to be appreciated that the pin apparatus 20 may be used in assemblies other than tilt steering columns. The pin apparatus 20 may be used in any assembly for coupling the first member 22 to the second member 26 and/or with at least one of the first member 22 and the second member 26 rotatable relative to each other. As an example described with reference to FIGS. 1-12, the first member 22 will be referred to as a first housing and the second member 26 will be referred to as a second housing.

Figures 2, 3, 5, 6:
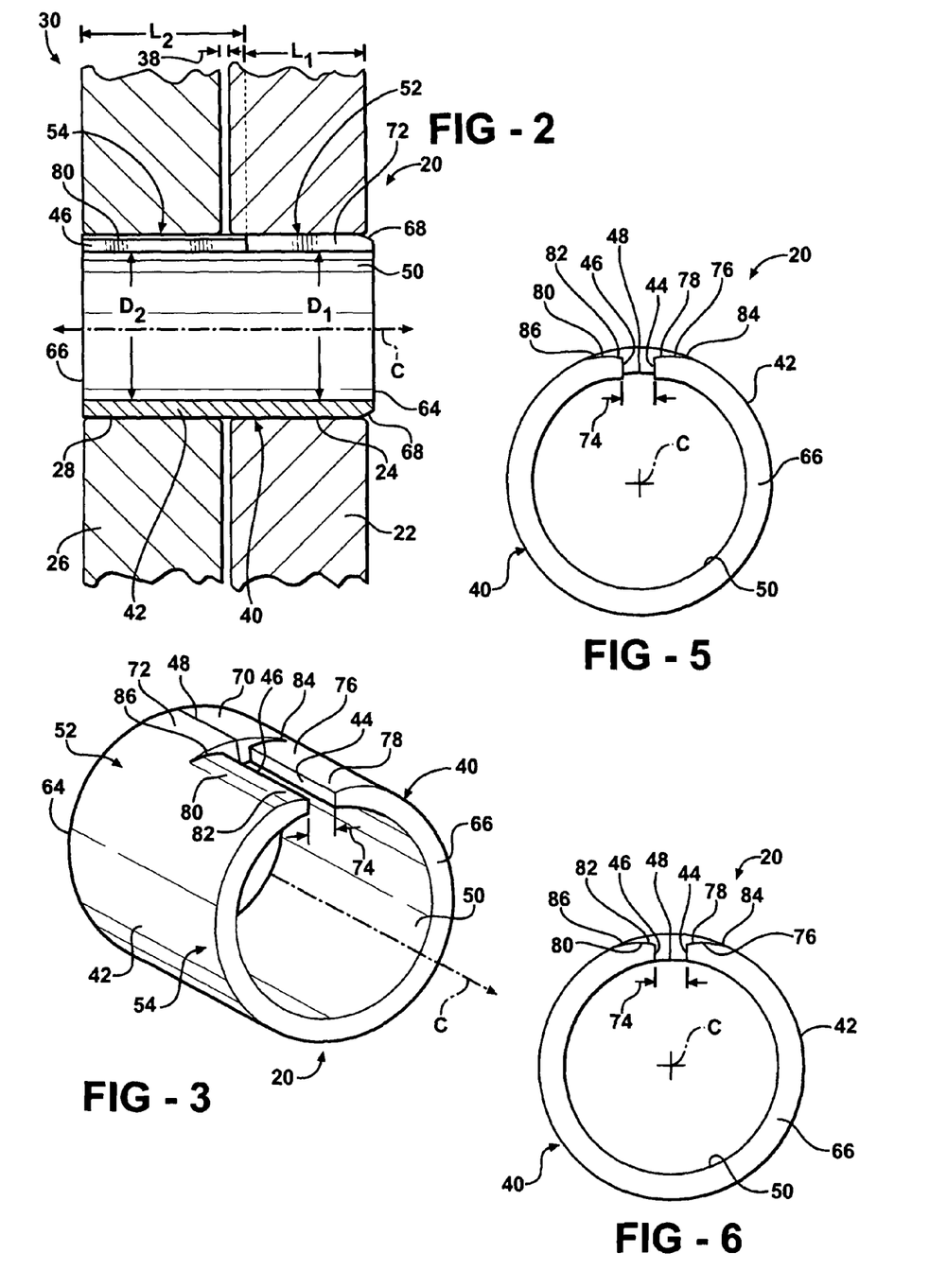
FIG. 2 is an enlarged cross-sectional view of the pin apparatus coupling the first member to the second member.
FIG. 3 is a perspective of the pin apparatus having a body including a first end and a second end facing the first end to define a seam.
FIG. 5 is a side view of the pin apparatus having a first and second arcuate portion extending inwardly toward a central axis.
FIG. 6 is a side view of the pin apparatus without the first and second arcuate portions extending inwardly toward the central axis.

Referring to FIGS. 1 and 2, the tilt steering column assembly 30 includes the first housing 22 defining the orifice 24 disposed along the central axis C and the second housing 26 defining the hole 28 disposed along the central axis C. A steering wheel 32 is coupled to the second housing 26 and is adjustable for achieving a desired position of the steering wheel 32 relative to a driver of the vehicle. The orifice 24 may be further defined as a plurality of orifices and the hole 28 may be further defined as a plurality of holes. The first housing 22 includes a plurality of first appendages 34 spaced from each other and extending substantially traverse to the central axis C with one of the first appendages 34 defining the orifice 24 along the central axis C and an other one of the first appendages 34 defining an other one of the orifices disposed along the central axis C. The second housing 26 includes a plurality of second appendages 36 spaced from each other and extending substantially traverse to the central axis C with one of the second appendages 36 defining the hole 28 disposed along the central axis C and an other one of the second appendages 36 defining an other one of the holes disposed along the central axis C. One of the first appendages 34 and one of the second appendages 36 are coupled together by the pin apparatus 20 and an other one of the first appendages 34 and an other one of the second appendages 36 are coupled together by an other pin apparatus 20.

The first housing 22 may be spaced from the second housing 26 along the central axis C to define an opening 38 therebetween and will be discussed in detail below. More specifically, each of the first appendages 34 are spaced from each of the second appendages 36 to define the opening 38 therebetween. The first housing 22 may be defined as a support housing and the second housing 26 may be defined as a tilt housing as known to those skilled in the art.

Figure 4:
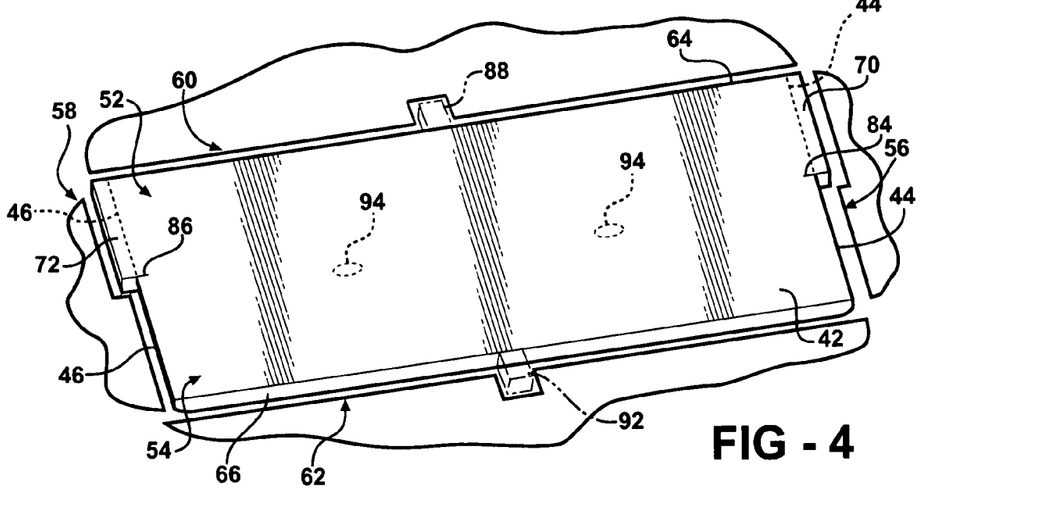
FIG. 4 is perspective view of a sheet material prior to forming the pin apparatus having a first portion and a second portion with a scrap material disposed about the pin apparatus after cutting the sheet material with the pin apparatus having a first finger and a second finger shown in phantom and defining a plurality of apertures shown in phantom as optional features of the first embodiment.

Also referring to FIGS. 3 and 4, the tilt steering column assembly 30 includes a pin 40 having a body 42. The pin apparatus 20 includes the pin 40 having the body 42 and all components associated with the body 42. However, it is to be appreciated that the body 42 may include other components as well. The body 42 includes a first end 44 and a second end 46 facing the first end 44 to define a seam 48 substantially parallel to the central axis C with the body 42 defining a bore 50 along the central axis C. The first end 44 and the second end 46 extend along the entire body 42 of the pin 40 and along the central axis C. The body 42 includes a first portion 52 adapted to be associated with at least one of the orifice 24 and the hole 28 and a second portion 54 extending from the first portion 52 and adapted to be associated with an other one of the orifice 24 and the hole 28 for coupling the first member 22 to the second member 26. More specifically, the body 42 includes the first portion 52 disposed in at least one of the orifice 24 and the hole 28 and the second portion 54 extending from the first portion 52 and disposed in an other one of the orifice 24 and the hole 28 for coupling the first housing 22 to the second housing 26. The body 42 includes a first periphery 56, a second periphery 58, a third periphery 60 and a fourth periphery 62 which separates a scrap material from the pin 40 when the pin 40 is formed and will be discussed in detail below.

The body 42 further includes a first side 64 adjacent the first portion 52 and a second side 66 spaced from the first side 64 and disposed adjacent the second portion 54. As shown, the seam 48 and the first and second ends 44, 46 extend between the first side 64 and the second side 66 of the body 42. Alternatively, the seam 48 may only extend partially along the body 42 such as when the body 42 is machined from a solid piece of material. As best shown in FIG. 2, the body 42 includes a sloped surface 68 disposed on the first side 64 for aiding in inserting the pin 40 into the orifice 24 and the hole 28. However it is to be appreciated that the sloped surface 68 may be disposed on the second side 66 or both the first and second sides 64, 66. It is further to be appreciated that the sloped surface may be defined as a chamfered surface, a curved surface, a blended surface or any other configuration for aiding in inserting the pin 40 into the orifice 24 and the hole 28.

Referring back to FIGS. 2-4, the body 42 preferably includes a first tab 70 extending outwardly from a segment of the first end 44 and a second tab 72 extending outwardly from a segment of the second end 46. The first and second tabs 70, 72 are integral with the first and second ends 44, 46 respectively. The first tab 70 abuts the second tab 72 to define a portion of the seam 48 with a remainder of the first and second ends 44, 46 being spaced from each other to define a gap 74 and a remaining portion of the seam 48 for providing a proper fit of the pin 40 within the orifice 24 and the hole 28 by compensating for varying dimensions of at least one of the orifice 24 and the hole 28, more specifically for providing a proper fit of the body 42 within the orifice 24 and the hole 28. The pin apparatus 20 is able to perform more uniformly over a wider range of dimensions and provide a lash free quality. The pin apparatus 20 reduces the tolerance requirements previously required in tilt steering column assemblies 30, thereby reducing the manufacturing costs. In other words, the pin apparatus 20 may be utilized in a larger tolerance range. As discussed above, the seam 48 may only extend partially about the body 42 such that the tabs 70, 72 would be integrated with the body 42 and would not define a portion of the seam 48.

As shown in the illustrated embodiment, the first and second tabs 70, 72 along the portion of the seam 48 define a length $L_1$ equal to the first portion 52. The remainder of the first and second ends 44, 46 along the remaining portion of the seam 48 defines a length $L_2$ equal to the second portion 54. The length $L_1$ of the first portion 52 may be less than, greater than, or equal to the length $L_2$ of the second portion 54. The bore 50 defines a first diameter $D_1$ along the portion of the seam 48 and a second diameter $D_2$ along the remaining portion of the seam 48. More specifically, the bore 50 defines the first diameter $D_1$ along the first portion 52 of the body 42 and the second diameter $D_2$ along the second portion 54 of the body 42. The first diameter $D_1$ of the bore 50 may be less than, greater than, or equal to the second diameter $D_2$ of the bore 50.

As best shown in FIG. 5, the remainder of the first end 44 defines a first arcuate portion 76 extending inwardly toward the central axis C for preventing the first end 44 from damaging at least one of the first and second housings 22, 26 and for biasing to compensate for varying dimensions of at least one of the orifice 24 and the hole 28. The first arcuate portion 76 defines a first inclined surface 78 disposed adjacent the first end 44 for preventing the first end 44 from damaging at least one of the first and second housings 22, 26. The remainder of the second end 46 defines a second arcuate portion 80 extending inwardly toward the central axis C for preventing the second end 46 from damaging at least one of the first and second housings 22, 26. The second arcuate portion 80 defines a second inclined surface 82 disposed adjacent the second end 46 for preventing the second end 46 from damaging at least one of the first and second housings 22, 26 and for biasing to compensate for varying dimensions of at least one of the orifice 24 and the hole 28. The first and second inclined surface 78, 82 may prevent damage to at least one of the first and second housings 22, 26 when at least one of the first and second housings 22, 26 rotate relative to each other. It is to be appreciated that extending the first and second arcuate portions 76, 80 inwardly toward the central axis C is optional and is eliminated as shown in FIG. 6.

Referring back to FIG. 3, the body 42 preferably defines a first slit 84 disposed at an intersection of the first tab 70 and the remainder of the first end 44 to further define the first arcuate portion 76 for aiding the first arcuate portion 76 in biasing to compensate for varying dimensions of at least one of the orifice 24 and the hole 28. The body 42 also preferably defines a second slit 86 opposing the first slit 84 and disposed at an intersection of the second tab 72 and the remainder of the second end 46 to further define the second arcuate portion 80 for aiding the second arcuate portion 80 in biasing to compensate for varying dimensions of at least one of the orifice 24 and the hole 28. The intersection is disposed at the point where the second portion 54 extends from the first portion 52. Preferably when the body 42 is disposed in the first and second housings 22, 26, the first and second slits 84, 86 are disposed in the first housing 22 and spaced from the second housing 26 as shown in FIG. 2. However it is to be appreciated that when the body 42 is disposed in the first and second housings 22, 26, the first and second slits 84, 86 may be disposed anywhere in either the first and second housings 22, 26 or disposed between the first and second housings 22, 26. The first and second slits 84, 86 may be cut, lanced, or sheared into the body 42. It is to be appreciated that the first and second slits 84, 86 may be narrow or wide relative to the central axis C to create an opening or gap of varying degree. Further, the slits 84, 86 may extend about the body 42 to any position as desired. It is also to be appreciated that the first and second arcuate portion 76, 80 may bias to compensate for varying dimensions of at least one of the orifice 24 and the hole 28 without utilizing the first and second slits 84, 86.

Figure 7:
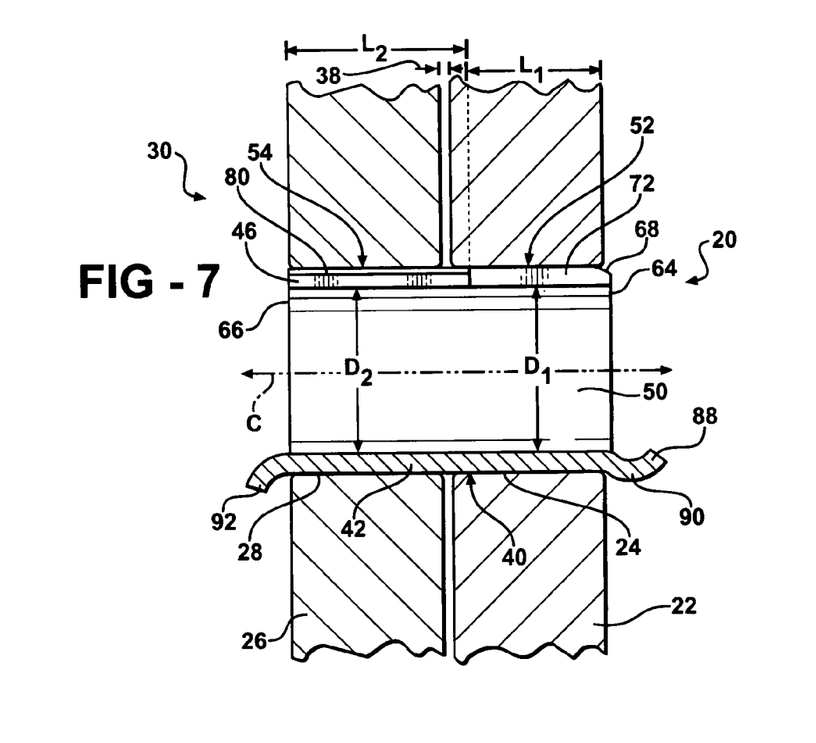
FIG. 7 is a cross-sectional view of the pin apparatus having a first finger and a second finger.

As shown in FIG. 7, the first side 64 of the body 42 may include a first finger 88 spaced from the seam 48 and extending outwardly away from the central axis C for preventing movement of the pin 40 along the central axis C. The first finger 88 defines a curved profile 90 for sliding the pin 40 through the orifice 24 and the hole 28 without damaging the first and second housings 22, 26. The first finger 88 may be flexed inwardly toward the central axis C for allowing the pin 40 to slide through the orifice 24 and the hole 28 with the first finger 88 flexing back outwardly away from the central axis C after the first finger 88 passes through the orifice 24 and the hole 28, thus returning the first finger 88 to an un-flexed position. The second side 66 of the body 42 may include a second finger 92 spaced from the seam 48 and extending outwardly away from the central axis C for preventing movement of the pin 40 along the central axis C. The second finger 92 may be circular in configuration or any other configuration for preventing movement of the pin 40 along the central axis C. In other words, the first finger 88 prevents the pin 40 from backing out of the orifice 24 and the hole 28 and the second finger 92 prevents the pin 40 from being pushed too far through the orifice 24 and the hole 28 when the pin 40 is inserted into the orifice 24 and the hole 28. It is to be appreciated that there may be more than one first finger 88 extending from the first side 64 and there may be more than one second finger 92 extending from the second side 66. It is also to be appreciated that the first and second fingers 88, 92 are optional.

Figure 8:
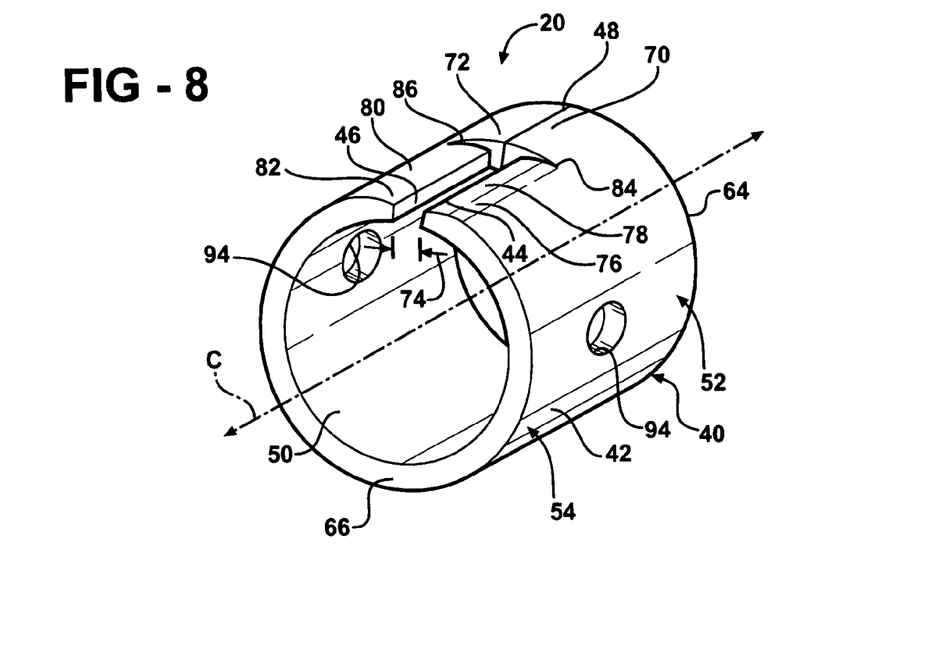
FIG. 8 is a perspective view of the pin apparatus defining a plurality of apertures spaced from a seam.
Figure 9:
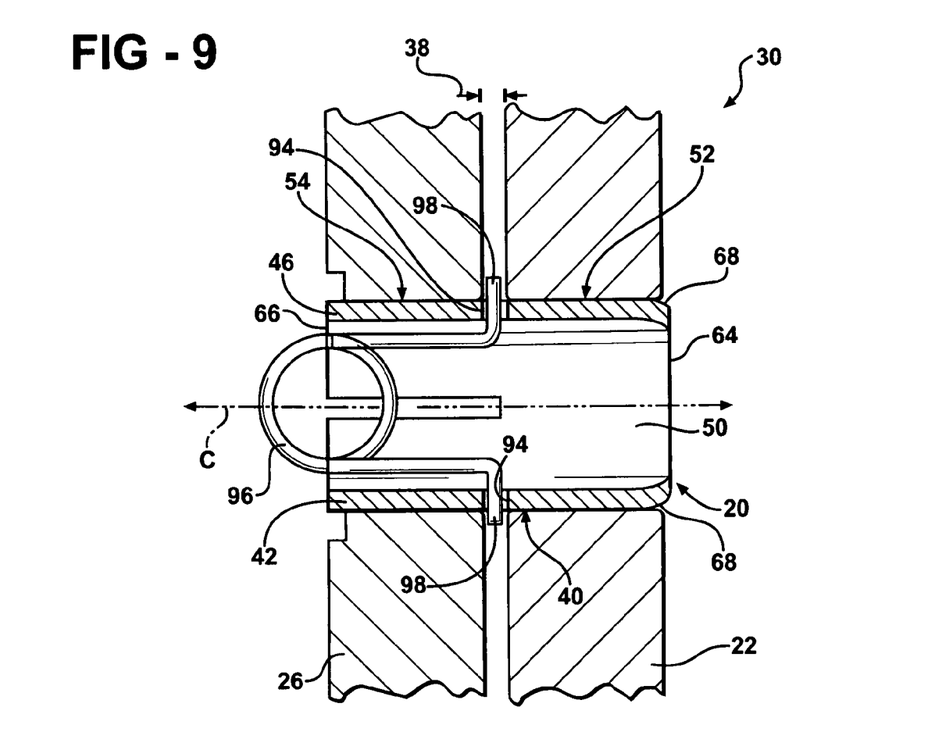
FIG. 9 is a partial cross-sectional view of a biasing member coupled to the apertures of the pin apparatus.

Referring to FIGS. 8 and 9, the body 42 may define a plurality of apertures 94 spaced from each other and radially spaced from the seam 48 about the body 42. The pin apparatus 20 includes a biasing member 96 having a plurality of arms 98 extending outwardly and disposed through the apertures 94 of the body 42 between the first and second housings 22, 26 for preventing movement of the pin 40 along the central axis C. However it is to be appreciated that the apertures 94 and the biasing member 96 are optional.

In one orientation as shown in FIG. 2, the first portion 52 is disposed in the orifice 24 of the first housing 22 and the second portion 54 is disposed in the hole 28 of the second housing 26 with the second housing 26 rotatable about the central axis C. In another orientation, the first portion 52 may be disposed in the hole 28 and the second portion 54 may be disposed in the orifice 24 with the first housing 22 rotatable about the central axis C. The first portion 52 is press fit or interference fit into at least one of the orifice 24 and the hole 28 and the second portion 54 is slip fit or clearance fit into an other one of the orifice 24 and the hole 28. Preferably, the first portion 52 is press fit into the orifice 24 and the second portion 54 is slip fit into the hole 28. A pressure acts on the first portion 52 while disposed in the orifice 24 and acts on the second portion 54 while disposed in the hole 28. The pressure acting on the second portion 54 is greater near the first portion 52 with the pressure decreasing on the second portion 54 from near the intersection to the second side 66. In other words, the second portion 54 is more resilient near the intersection with the resiliency decreasing toward the second side 66 of the second portion 54. This is commonly referred to as a coning effect of the second portion 54 and/or the hole 28 as known to those skilled in the art. If coning occurs to the hole 28 then the first arcuate portion 76 and the second arcuate portion 80 bias to fit the hole 28. In other words, the first and second arcuate portions 76, 80 bias outwardly away from the central axis C to compensate for varying dimensions and provide the lash free quality of the pin 40. The first and second slits 84, 86 are disposed in the first housing 22 and spaced from the second housing 26 such that less resiliency acts on the first and second arcuate portions 76, 80 disposed in the second housing 26 which allows the first and second arcuate portions 76, 80 to bias to compensate for varying dimensions, perform more uniformly over the wider range of tolerances, and provide the lash free quality. However it is to be appreciated that the first and second arcuate portions 76, 80 may bias inwardly toward the central axis C to compensate for varying dimensions and provide the lash free quality of the pin 40. As discussed above, the configuration of the second portion 54 allows the pin 40 to perform more uniformly over the wider range of tolerances.

Preferably, the pin apparatus 20 is formed from a homogeneous material. For example, the body 42, the first and second tabs 70, 72, and the first and second fingers 88, 92 are formed from the homogeneous material. More specifically, the pin 40 is formed from a sheet material. The sheet material may be a metal such as steel. The sheet material may be SAE grade 1070-1095. However it is to be appreciated that the sheet material may be a polymer such as thermoplastic, a composite such as carbon-fiber, and/or any other suitable materials known in the art and any combinations thereof. Preferably, the pin 40 is heat treated to achieve the desired hardness, such as HR15N 82-87 or the equivalent of HRC 42-52. The pin 40 is quenched and temper as known to those skilled in the art. However it is to be appreciated that the pin 40 may be austemper to the above hardness range which provides better dimensional control, less distortion, and more elasticity or any other treatment(s) to achieve the desired hardness as known to those skilled in the art. The pin 40 may be coated with a calcium modified zinc phosphate coating, 300-500 mg/0.10 square meter followed by a 20-30% concentration of a soluble oil dip. It is to be appreciated that the material(s) the pin 40 is formed from, the treatment and the coating the pin 40 undergoes depends on the application the pin 40 is being used in.

Figure 10:
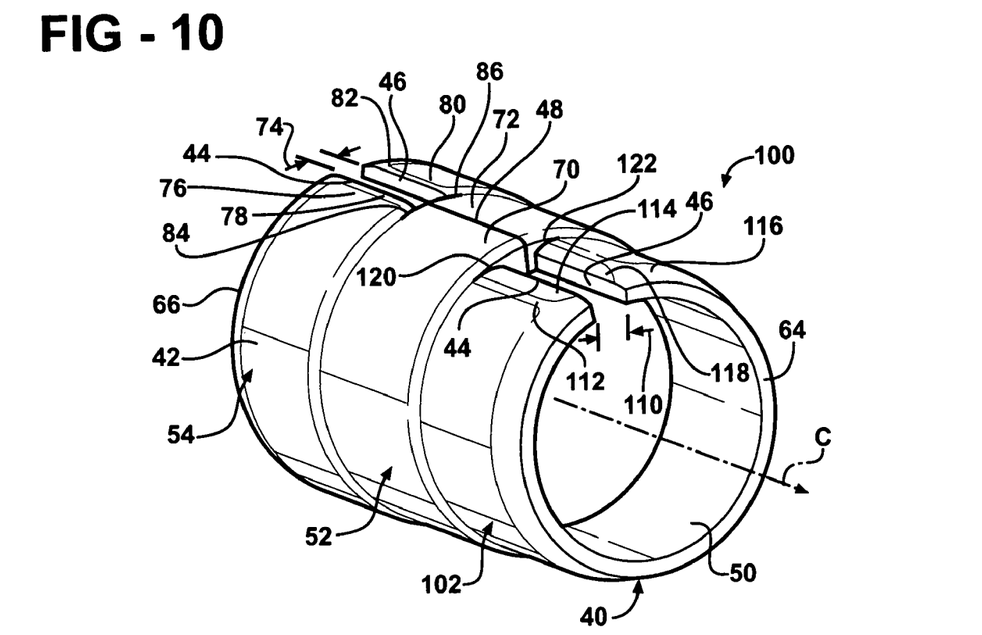
FIG. 10 is a perspective view of a pin apparatus having the first portion, the second portion, and a third portion of a second embodiment.
Figure 11:
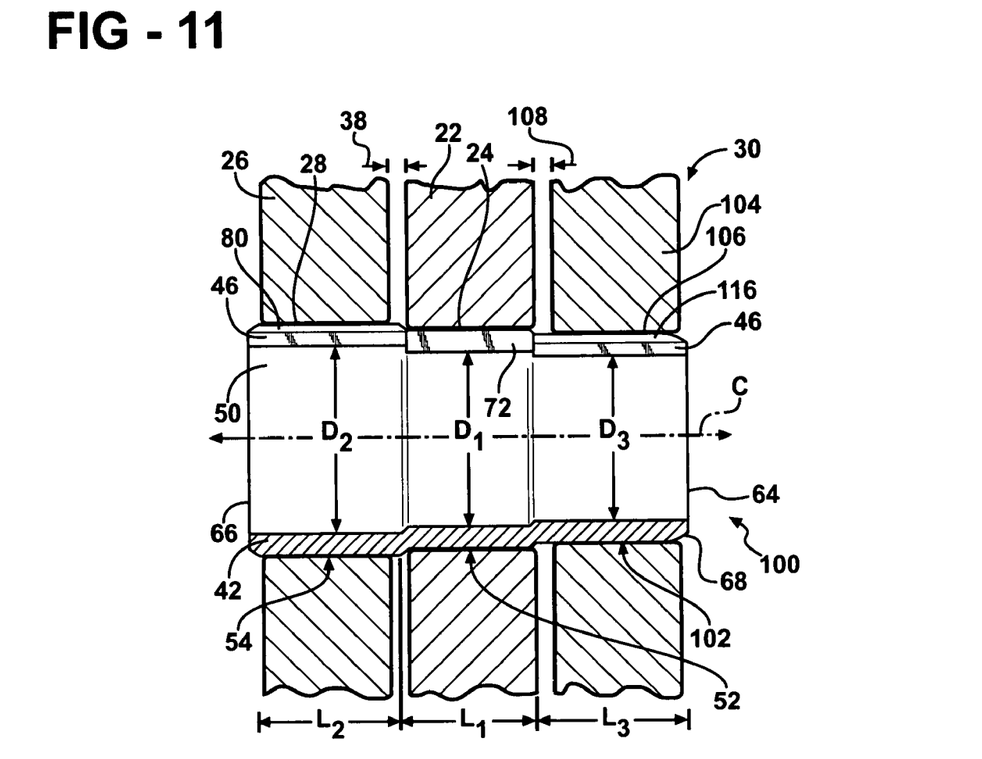
FIG. 11 is a cross-sectional view of the tilt steering column assembly having the pin apparatus of the second embodiment.
Figure 12:
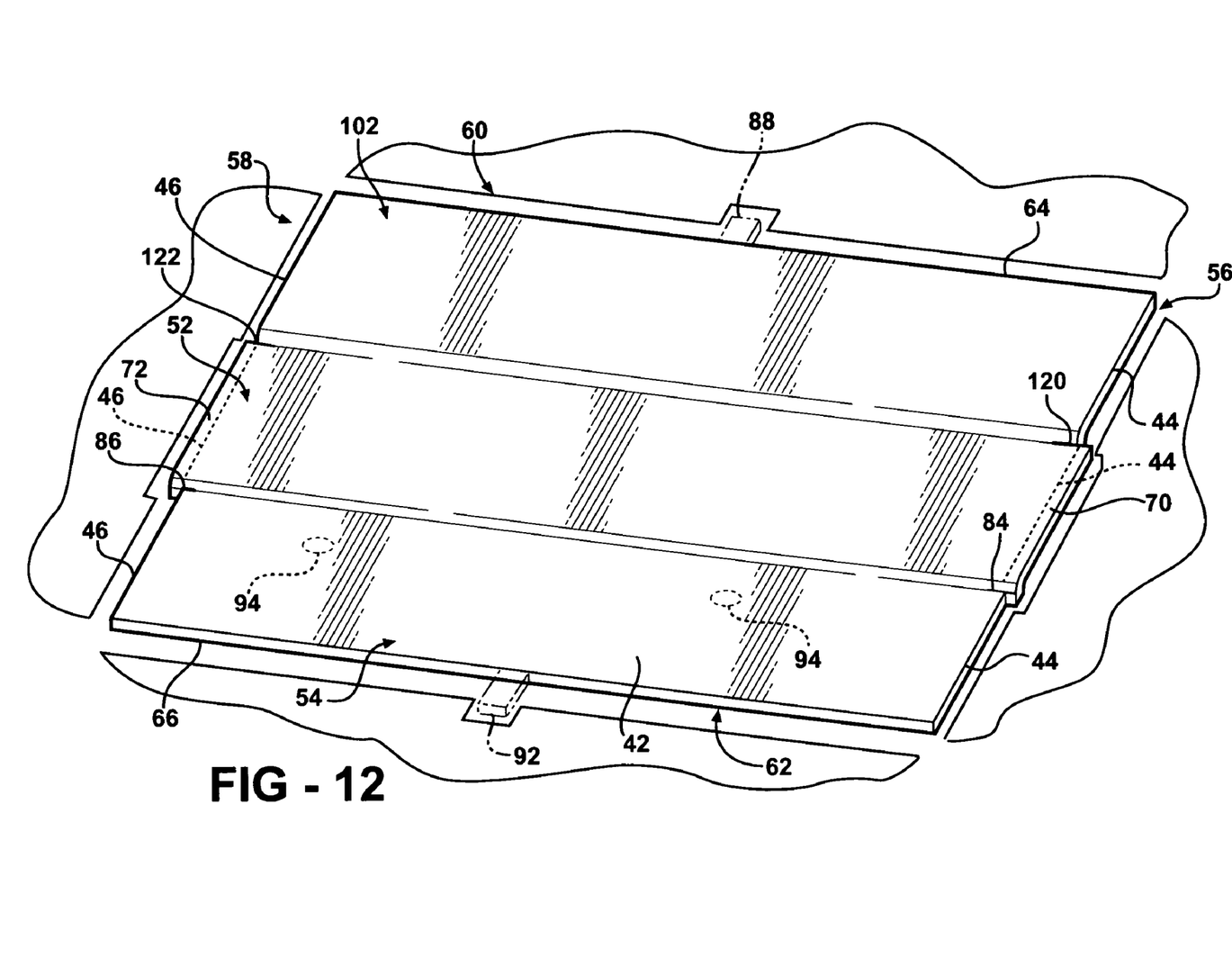
FIG. 12 is a perspective view of the sheet material prior to forming the pin apparatus with the scrap material disposed about the pin apparatus after cutting the sheet material with the first and second fingers shown in phantom and the apertures shown in phantom as optional features of the second embodiment.

Referring to FIGS. 10-12, a second embodiment of the pin apparatus 100, wherein like numerals indicate like or corresponding parts throughout the several views, is generally shown. All of the features of the pin apparatus 20 discussed in the first embodiment apply to this embodiment, including the optional features. The primary distinction between the first embodiment and the second embodiment is the body 42 further includes a third portion 102 extending from the first portion 52 and spaced from the second portion 54. The first and second ends 44, 46 of the third portion 102 are spaced from each other to define a second gap 110 and a further portion of the seam 48. In this embodiment, the gap 74 as discussed in the first embodiment is defined as a first gap 74 and the first side 64 as discussed in the first embodiment is disposed on the third portion 102.

The tilt steering column assembly 30 further includes a bracket 104 defining at least one hollow 106 along the central axis C and may be disposed adjacent at least one of the first and second housings 22, 26. The third portion 102 may be disposed in the hollow 106. However it is to be appreciated that the third portion 102 may be disposed in the hole 28 of the second housing 26 and the second portion 54 may be disposed in the hollow 106 of the bracket 104. It is to be further appreciated that a third housing, a brace, a support or any other member may be used instead of the bracket 104. The bracket 104 may be spaced from the first housing 22 to define a second opening 108. In this embodiment, the opening 38 as discuss in the first embodiment is defined as the first opening 38.

The first portion 52, the second portion 54, and/or the third portion 102 may define the apertures 94. The arms 98 of the biasing member 96 may extend through the apertures 94 of the body 42 between the first opening 38 and/or through the second opening 108. It is to be appreciated that more than one biasing member 96 may be used.

The further portion of the seam 48 defines a third arcuate portion 112 extending inwardly toward the central axis C for preventing the first end 44 from damaging at least one of the first housing 22, the second housing 26, and the bracket 104 and for biasing to compensate for varying dimensions of at least one of the orifice 24, the hole 28, and the hollow 106. The third arcuate portion 112 defines a third inclined surface 114 disposed adjacent the first end 44 for preventing the first end 44 from damaging at least one of the first housing 22, the second housing 26, and the bracket 104. The further portion of the seam 48 defines a fourth arcuate portion 116 extending inwardly toward the central axis C for preventing the second end 46 from damaging at least one of the first housing 22, the second housing 26, and the bracket 104 and for biasing to compensate for varying dimensions of at least one of the orifice 24, the hole 28, and the hollow 106. The fourth arcuate portion 116 defines a fourth inclined surface 118 disposed adjacent the second end 46 for preventing the second end 46 from damaging at least one of the first housing 22, the second housing 26, and the bracket 104. The third and fourth inclined surface 114, 118 may prevent damage to at least one of the first housing 22, the second housing 26, and the bracket 104 when at least one of the first and second housings 22, 26 rotate relative to each other. It is to be appreciated that extending the third and fourth arcuate portions 112, 116 inwardly toward the central axis C is optional.

The body 42 defines a third slit 120 disposed at a second intersection of the first tab 70 and the further portion of the seam 48 along the first end 44 to further define the third arcuate portion 112 for aiding the third arcuate portion 112 in biasing to compensate for varying dimensions of at least one of the orifice 24, the hole 28, and the hollow 106. The body 42 defines a fourth slit 122 opposing the third slit 120 and disposed at a second intersection of the second tab 72 and the further portion of the seam 48 along the second end 46 to further define the fourth arcuate portion 116 for aiding the fourth arcuate portion 116 in biasing to compensate for varying dimensions of at least one of the orifice 24, the hole 28, and the hollow 106. The second intersection is disposed at the point where the third portion 102 extends from the first portion 52. Preferably when the body 42 is disposed in the first and second housings 22, 26 and the bracket 104, the third and fourth slits 120, 122 are disposed in the first housing 22 and spaced from the bracket 104 as shown in FIG. 11. However it is to be appreciated that when the body 42 is disposed in the first and second housings 22, 26 and the bracket 104, the third and fourth slits 120, 122 may be disposed anywhere in either the first housing 22 or the bracket 104, or disposed between the first housing 22 and the bracket 104. The third and fourth slits 120, 122 may be cut, lanced, or sheared into the body 42. It is to be appreciated that the third and fourth slits 120, 122 may be narrow or wide relative to the central axis C. It is also to be appreciated that the third and fourth arcuate portion 112, 116 may bias to compensate for varying dimensions of at least one of the orifice 24 and the hole 28 without utilizing the third and fourth slits 120, 122.

If coning occurs to the hollow 106 then the third arcuate portion 112 and the fourth arcuate portion 116 bias to fit the hollow 106. In other words, the third and fourth arcuate portions 112, 116 bias outwardly away from the central axis C to compensate for varying dimensions and provide the lash free quality of the pin 40. The third and fourth slits 120, 122 are disposed in the first housing 22 and spaced from the bracket 104 such that less resiliency acts on the third and fourth arcuate portions 112, 116 disposed in the bracket 104 which allows the third and fourth arcuate portions 112, 116 to bias to compensate for varying dimensions, perform more uniformly over the wider range of tolerances, and provide the lash free quality. As discussed above, the configuration of the third portion 102 allows the pin 40 to perform more uniformly over the wider range of tolerances.

The bore 50 defines a third diameter $D_3$ along the further portion of the seam 48. More specifically, the bore 50 defines the third diameter $D_3$ along the third portion 102 of the body 42. The first diameter $D_1$, the second diameter $D_2$, and the third diameter $D_3$ may be any diameter as long as the first diameter $D_1$ is greater than at least one of the second diameter $D_2$ and third diameter $D_3$. The first and second ends 44, 46 along the further portion of the seam 48 defines a length $L_3$ equal to the third portion 102. The length $L_3$ of the third portion 102 may be may be less than, greater than, or equal to the length $L_1$ of the first portion 52 and/or the length $L_2$ of the second portion 54.

Referring to FIGS. 4 and 12, a method of making the pin 40 formed from the sheet material having the body 42 including the first periphery 56 and the second periphery 58 with the body 42 having the first portion 52 and the second portion 54 extending from the first portion 52. The method includes the steps of cutting the first periphery 56 to a predetermined length to define the first tab 70 extending from the first end 44 and cutting the second periphery 58 to a predetermined length to define the second tab 72 extending from the second end 46. The steps of cutting the first and second peripheries 56, 58 to define the first and second tabs 70, 72 is further defined as cutting the first and second peripheries 56, 58 to the predetermined length to define the first and second tabs 70, 72 equal to the first portion 52 with the remainder of the first and second ends 44, 46 defining the second portion 54. The body 42 is cut to define the first slit 84 disposed at an intersection of the first tab 70 and the remainder of the first end 44 to further define the first arcuate portion 76 and the body 42 is cut to define the second slit 86 opposing the first slit 84 and disposed at an intersection of the second tab 72 and the remainder of the second end 46 to further define the second arcuate portion 80. The body 42 may be further cut to define the plurality of apertures 94 spaced from each other and radially spaced from the seam 48 about the body 42, as shown in phantom in FIGS. 4 and 12.

The method further includes the step of rolling the body 42 until the first and second tabs 70, 72 abut each other to define the bore 50 and the portion of the seam 48 with the remainder of the first and second ends 44, 46 spaced from each other to define the gap 74 and the remaining portion of the seam 48 to form the pin 40 that compensates for varying dimensions. The first end 44 of the remainder is formed inwardly toward the bore 50 to define the first arcuate portion 76 and the second end 46 of the remainder is formed inwardly toward the bore 50 to define the second arcuate portion 80 to prevent the first and second ends 44, 46 from damaging at least one of the first and second housings 22, 26 and to bias to compensate for varying dimensions of at least one of the orifice 24 and the hole 28. The first arcuate portion 76 is formed to define the first inclined surface 78 disposed adjacent the first end 44 and the second arcuate portion 80 is formed to define a second inclined surface 82 disposed adjacent the second arcuate portion 80 to prevent the first and second ends 44, 46 from damaging at least one of the first and second housings 22, 26.

The body 42 includes the third periphery 60 and the fourth periphery 62 and further including the steps of cutting the third periphery 60 to define the first side 64 and cutting the fourth periphery 62 to define the second side 66. The step of cutting the third and fourth periphery 60, 62 may further includes the steps of cutting the third periphery 60 to define the first finger 88 and cutting the fourth periphery 62 to define the second finger 92, as shown in phantom in FIGS. 4 and 12. The method further includes the steps of forming the sloped surface 68 disposed on the first portion 52 and adjacent the first side 64 to aid in inserting pin 40 into at least one of the orifice 24 and the hole 28 and forming the first and second fingers 88, 92 to prevent movement of the pin 40 along the central axis C.

The body 42 may include the third portion 102 extending from the first portion 52 and spaced from the second portion 54 and wherein the step of cutting the first and second peripheries 56, 58 is further defined as the step of cutting the first and second peripheries 56, 58 to the predetermined length to define the first portion 52, the second portion 54, and the third portion 102. The first and second ends 44, 46 of the third portion 102 are spaced from each other to define the second gap 110 and the further portion of the seam 48. The further portion of the seam 48 defines the third arcuate portion 112 and further includes the step of forming the third arcuate portion 112 inwardly toward the central axis C to prevent the first end 44 from damaging at least one of the first housing 22, the second housing 26, and the bracket 104 and to bias to compensate for varying dimensions of at least one of the orifice 24, the hole 28, and the hollow 106. The step of forming the third arcuate portion 112 is further defined as the step of forming the third arcuate portion 112 to define the third inclined surface 114 disposed adjacent the first end 44 to prevent the first end 44 from damaging at least one of the first housing 22, the second housing 26, and the bracket 104. The further portion of the seam 48 defines the fourth arcuate portion 116 and further includes the step of forming the fourth arcuate portion 116 inwardly toward the central axis C to prevent the second end 46 from damaging at least one of the first housing 22, the second housing 26, and the bracket 104 and to bias to compensate for varying dimensions of at least one of the orifice 24, the hole 28, and the hollow 106. The step of forming the fourth arcuate portion 116 is further defined as the step of forming the fourth inclined surface 118 disposed adjacent the second end 46 to prevent the second end 46 from damaging at least one of the first housing 22, the second housing 26, and the bracket 104.

The body 42 is cut to define the third slit 120 disposed at the second intersection of the first tab 70 and the further portion of the seam 48 along the first end 44 to further define the third arcuate portion 112 for aiding the third arcuate portion 112 in biasing to compensate for varying dimensions of at least one of the orifice 24, the hole 28, and the hollow 106. The body 42 is cut to define the fourth slit 122 opposing the third slit 120 and disposed at the second intersection of the second tab 72 and the further portion of the seam 48 along the second end 46 to further define the fourth arcuate portion 116 for aiding the fourth arcuate portion 116 in biasing to compensate for varying dimensions of at least one of the orifice 24, the hole 28, and the hollow 106.

Obviously, many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

What is claimed is:

1. A tilt steering column assembly comprising:
   a steering column having a first housing and a tilt housing;
   said first housing defining at least one orifice disposed along a central axis,
   said tilt housing defining at least one hole disposed along said central axis,
   a steering column pivot pin including a body having a first end and a second end facing said first end to define a seam substantially parallel to said central axis with said body defining a bore along said central axis, and said body having a first portion disposed in said orifice and a second portion extending from said first portion and disposed in said hole for rotatably coupling said first housing to said tilt housing;
   a first tab extending outwardly from a segment of said first end and a second tab extending outwardly from a segment of said second end with said first tab abutting said second tab to define a portion of said seam, with a remainder of said first end and a remainder of said second end being spaced from each other to define a gap and a remaining portion of said seam such that said steering column pivot pin is fitted within said orifice and said hole to compensate for varying dimensions of at least one of said orifice and said hole;
   said remainder of said first end defining a first arcuate portion that extends radially inwardly toward said central axis relative to the first tab and has a first top edge proximate to said gap that is about radially equidistant from said central axis along an entire length of said first arcuate portion, said first arcuate portion being at least partially disposed in said hole of said tilt housing; and
   said remainder of said second end defining a second arcuate portion that extends radially inwardly toward said central axis relative to the second tab and has a second top edge proximate to said gap that is about radially equidistant from said central axis along an entire length of said second arcuate portion, said second arcuate portion being at least partially disposed in said hole of said tilt housing.

2. The steering column assembly as set forth in claim 1 wherein said first arcuate portion biases said body to compensate for varying dimensions of said hole and wherein said second arcuate portion biases said body to compensate for varying dimensions of said hole.

3. The steering column assembly as set forth in claim 2 wherein said first arcuate portion defines a first inclined surface adjacent said first end for preventing damage to said tilt housing and said second arcuate portion defines a second inclined surface adjacent said second end for preventing damage to at said tilt housing.

4. The steering column assembly as set forth in claim 2 wherein said first arcuate portion extends inwardly toward said central axis for preventing said first end from damaging said tilt housing and wherein said second arcuate portion extends inwardly toward said central axis for preventing said second end from damaging said tilt housing.

5. The steering column assembly as set forth in claim 2 wherein said body defines a first slit disposed at an intersection of said first tab and said remainder of said first end to further define said first arcuate portion for aiding said first arcuate portion in biasing to compensate for varying dimensions of at least one of said orifice and said hole.

6. The steering column assembly as set forth in claim 5 wherein said body defines a second slit opposing said first slit and disposed at an intersection of said second tab and said remainder of said second end to further define said second arcuate portion for aiding said second arcuate portion in biasing to compensate for varying dimensions of at least one of said orifice and said hole.

7. The steering column assembly as set forth in claim 1 wherein said first and second tabs along said portion of said seam define a length equal to said first portion.

8. The steering column assembly as set forth in claim 7 wherein said remainder of said first and second ends along said remaining portion of said seam defines a length equal to said second portion.

9. The steering column assembly as set forth in claim 8 wherein said first portion is disposed in said orifice and said second portion is disposed in said hole with said tilt housing rotatable about said central axis.

10. The steering column assembly as set forth in claim 1 wherein said first portion defines a continuous body extending circumferentially between said first and second ends.

11. The steering column assembly as set forth in claim 10 wherein said second portion defines a continuous body extending circumferentially between said first and second ends.

* * * * *